United States Patent
Belser et al.

(10) Patent No.: US 6,604,223 B1
(45) Date of Patent: Aug. 5, 2003

(54) SYSTEM AND METHOD FOR CORRECTING INTERFERENCE ERRORS IN DATA ENCODED ON STORAGE MEDIA

(75) Inventors: Karl A. Belser, San Jose, CA (US); Aihua E. Li, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/315,591

(22) Filed: May 20, 1999

Related U.S. Application Data

(60) Provisional application No. 60/096,728, filed on Aug. 17, 1998, and provisional application No. 60/112,261, filed on Dec. 15, 1998.

(51) Int. Cl.[7] .......................... G06F 11/00; H03M 13/00
(52) U.S. Cl. ...................... 714/812; 360/41; 360/77.08; 369/44.32
(58) Field of Search .......................... 714/812, 818–824, 714/4, 712, 797, 794–796; 709/248; 340/310, 825; 359/561, 562, 566, 112; 369/8, 30.12, 44.25, 44.32, 44.13, 44.26, 47.54, 53.14, 47.1, 53.11, 59.25, 100, 275; 360/77.08, 53, 49, 75; 711/112, 113, 202; 341/96

(56) References Cited

U.S. PATENT DOCUMENTS

| | | | |
|---|---|---|---|
| 4,559,568 A | * | 12/1985 | Watanabe et al. ............. 360/48 |
| 4,774,700 A | * | 9/1988 | Satoh et al. ............. 369/47.14 |
| 4,983,002 A | * | 1/1991 | Shikama et al. ............... 359/1 |
| 5,023,857 A | * | 6/1991 | Verboom .................. 369/44.25 |
| 5,057,946 A | * | 10/1991 | Sugiyama ..................... 360/46 |
| 5,369,535 A | | 11/1994 | Hetzler ..................... 360/78.14 |
| 5,442,498 A | | 8/1995 | Cheung et al. .......... 360/77.08 |
| 5,452,284 A | | 9/1995 | Miyagawa et al. ......... 369/124 |
| 5,615,065 A | | 3/1997 | Cheung .................... 360/77.08 |
| 5,661,760 A | | 8/1997 | Patapoutian et al. ........ 375/341 |
| 5,717,538 A | | 2/1998 | Cheung et al. .......... 360/77.08 |
| 5,774,298 A | | 6/1998 | Cheung et al. .......... 360/77.08 |
| 5,790,340 A | | 8/1998 | Ishii ............................ 360/75 |

FOREIGN PATENT DOCUMENTS

JP          07105628        4/1995      ........... G11B/20/10

* cited by examiner

*Primary Examiner*—Albert Decady
*Assistant Examiner*—Guy Lamarre
(74) *Attorney, Agent, or Firm*—Robert P. Lenart, Esq.; Pietragallo, Bosick & Gordon

(57) ABSTRACT

A system and method for correcting interference errors in data encoded on storage media comprising position marks disposed on a storage medium, the position marks being configured to encode a plurality of track addresses and at least four track types. A correction module detects and corrects errors in the track addresses by combining each of the track addresses with one of the track types and then recognizing incorrect addresses. The correction module replaces incorrect addresses with correct addresses using a look-up table, wherein each incorrect address is not identical to one of the correct addresses. The plurality of position marks that encode the track types are also used to generate a position error signal for position correction of a head device.

43 Claims, 10 Drawing Sheets

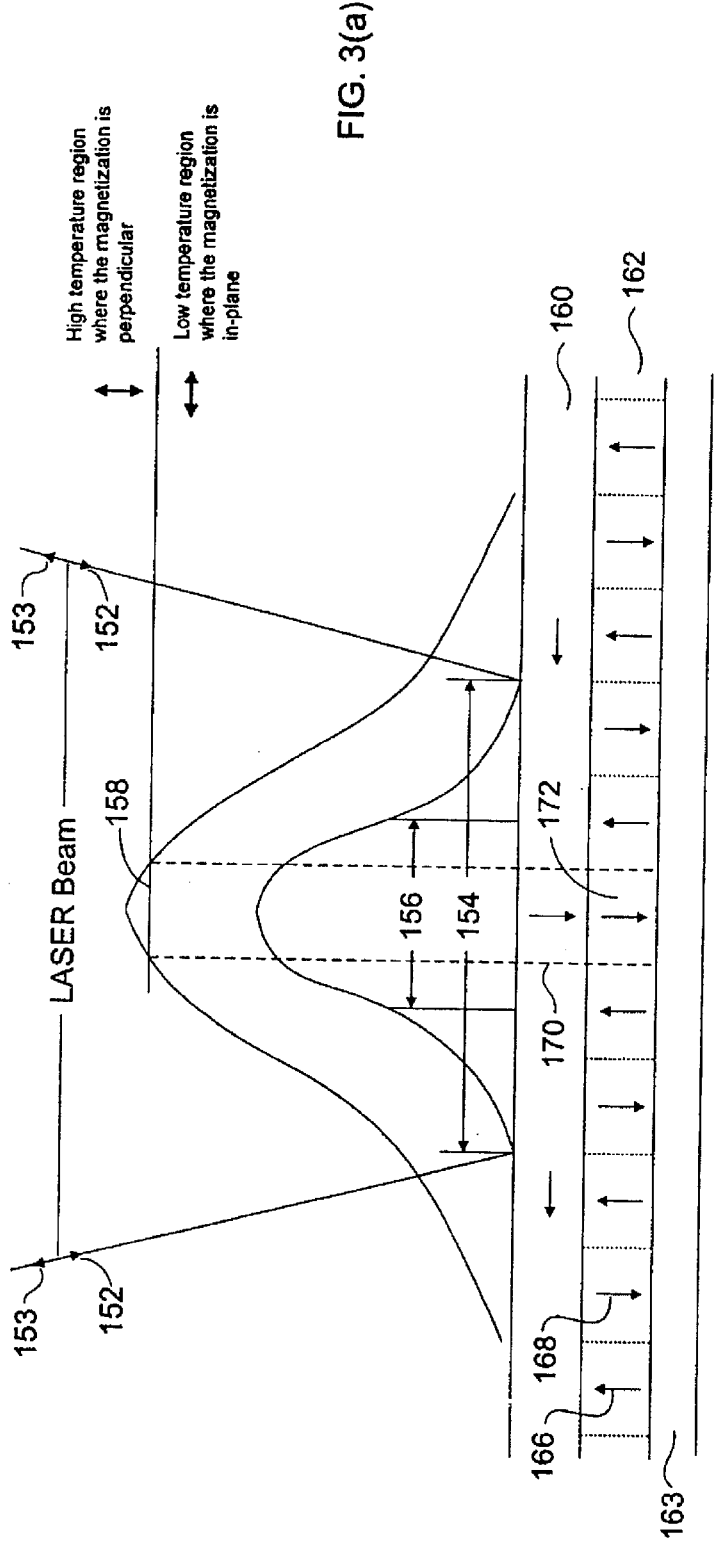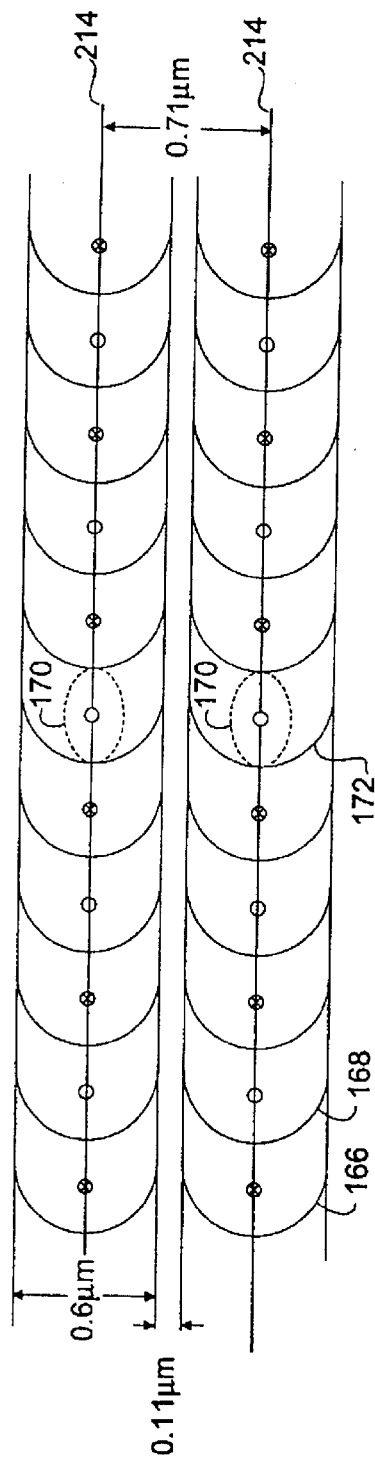
FIG. 3(a)
FIG. 3(b)

$$PES = \text{if } ( |A-B| < |C-D| ) \text{ then } \frac{A-B}{C-D}, \text{else } \frac{C-D}{A-B}$$

| Track | Address Bits | PES Type | Runt Bit Errors | Weak One Errors |
|---|---|---|---|---|
| -- | H0-00D | D | H1-00D | H1-00D |
| 0 | H1-00A | A | H0-00A | H0-00A |
| 1 | H1-00C | C | H1-01C | ---- |
| 2 | H1-01B | B | ---- | H1-00B |
| 3 | H1-01D | D | H1-11D | ---- |
| 4 | H1-11A | A | ---- | H1-01A |
| 5 | H1-11C | C | ---- | H1-10C |
| 6 | H1-10B | B | H1-11B | ---- |
| 7 | H1-10D | D | H0-10D | H0-10D |
| -- | H0-10A | A | H1-10A | H1-10A |

SYSTEM AND METHOD FOR CORRECTING INTERFERENCE ERRORS IN DATA ENCODED ON STORAGE MEDIA

CROSS-REFERENCE TO RELATED APPLICATION

This application is related to, and claims the benefit of, Provisional Application No. 60/096,728, entitled "Radial Position Encoding Method For Optical Disk Drives That Is Robust To Errors Due To Adjacent Track Information," filed Aug. 17, 1998. This application is also related to, and claims the benefit of, Provisional Application No. 60/112,261, entitled "Radial Position Encoding Method for Optical Disk Drives," filed Dec. 15, 1998. The subject matter of these related applications is incorporated herein by reference. The related applications are commonly assigned.

BACKGROUND OF THE INVENTION

1. Field of the Invention

This invention relates generally to data encoded on storage media and relates more particularly to a system and method for correcting interference errors in data encoded on storage media.

2. Description of the Background Art

Efficient, economic, and reliable storage of digital data is an important consideration of manufacturers, designers, and users of computing systems. In magneto-optical storage devices, digital data is typically stored in tracks located on rotating disks of magneto-optical (MO) storage media. Close positioning of the adjacent disk tracks maximizes the amount of stored magnetic data on a storage disk, thus providing significant economic benefits to system manufacturers and users. Therefore, system designers frequently seek new and improved methods of reducing track pitch to permit greater storage capacity on the storage media.

Storage devices using magnetic super resolution (MSR) storage media allow for very narrow track pitch. A MSR media produces a readout aperture when heated by a light spot. The aperture allows magnetic data in a storage layer to become visible. The edges of the aperture mask magnetic data stored in adjacent tracks, so there are typically negligible interference errors in the magnetic data read from the MSR media.

In MO storage devices, magnetic data is typically stored and retrieved from the storage media using a magneto-optical head. The head must be accurately positioned above a selected track while storing or retrieving data. One method for position correction of the head utilizes read-only data encoded on a surface of the storage media. This type of data is read by detecting a change in amplitude of a light signal reflected from the surface of the storage media, instead of by detecting a magnetic field in the storage layer. There is no masking effect for read-only data, so when the track pitch is narrow errors due to adjacent track interference may occur.

Errors in the read-only data may cause the head to be positioned incorrectly, which in turn may cause the MO storage device to perform unreliably. Therefore an improved system and method are needed to correct interference errors in data encoded on storage media.

SUMMARY OF THE INVENTION

In accordance with the present invention, a system and method are disclosed to correct interference errors in data encoded on storage media. The invention includes position marks disposed on a storage medium, the position marks being configured to encode a plurality of track addresses and to encode track types. A correction module detects and corrects errors in the track addresses by combining each of the track addresses with one of the track types so that the track type becomes part of the track address. The correction module then recognizes incorrect addresses, and replaces the incorrect addresses with correct addresses. Each incorrect address is not identical to a correct address.

In one embodiment, the position marks encode at least four track types, and each track address includes a high-order address byte and a low-order address byte. The low-order address bytes are encoded in track pairs, so the address and one of the track types uniquely identify each track. Each low-order address byte contains a check bit used to correct single bit errors in each corresponding high-order.byte. The position marks that encode the track types are also used to generate a position error signal for position correction of a head device used to store and retrieve data from the storage media.

Therefore, the present invention more efficiently and effectively corrects interference errors in data encoded on storage media.

BRIEF DESCRIPTION OF THE DRAWINGS

FIG. 3(a) illustrates a temperature profile and a full-width-half-maximum diameter of a laser beam impinging on a cross-section of the magneto-optical storage medium of FIG. 1, according to the present invention;

FIG. 3(b) is a top view of an aperture formed over magnetic domains in the magneto-optical storage medium of FIG. 1, according to the present invention;

DETAILED DESCRIPTION OF THE PREFERRED EMBODIMENT

The present invention relates to an improvement in correcting interference errors in data encoded on storage media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for correcting interference errors in data encoded on storage media that comprises position marks disposed on a storage medium configured to encode a plurality of track addresses and track types, and a correction module. The correction module detects and corrects errors in the track addresses by combining each of the track addresses with one of the track types and then recognizing incorrect addresses. The correction module replaces incorrect addresses with correct addresses using a look-up table, wherein each incorrect address is not identical to one of the correct addresses. The plurality of position marks that encode the track types are also used to generate a position error signal for position correction of a head device.

Figure 1:
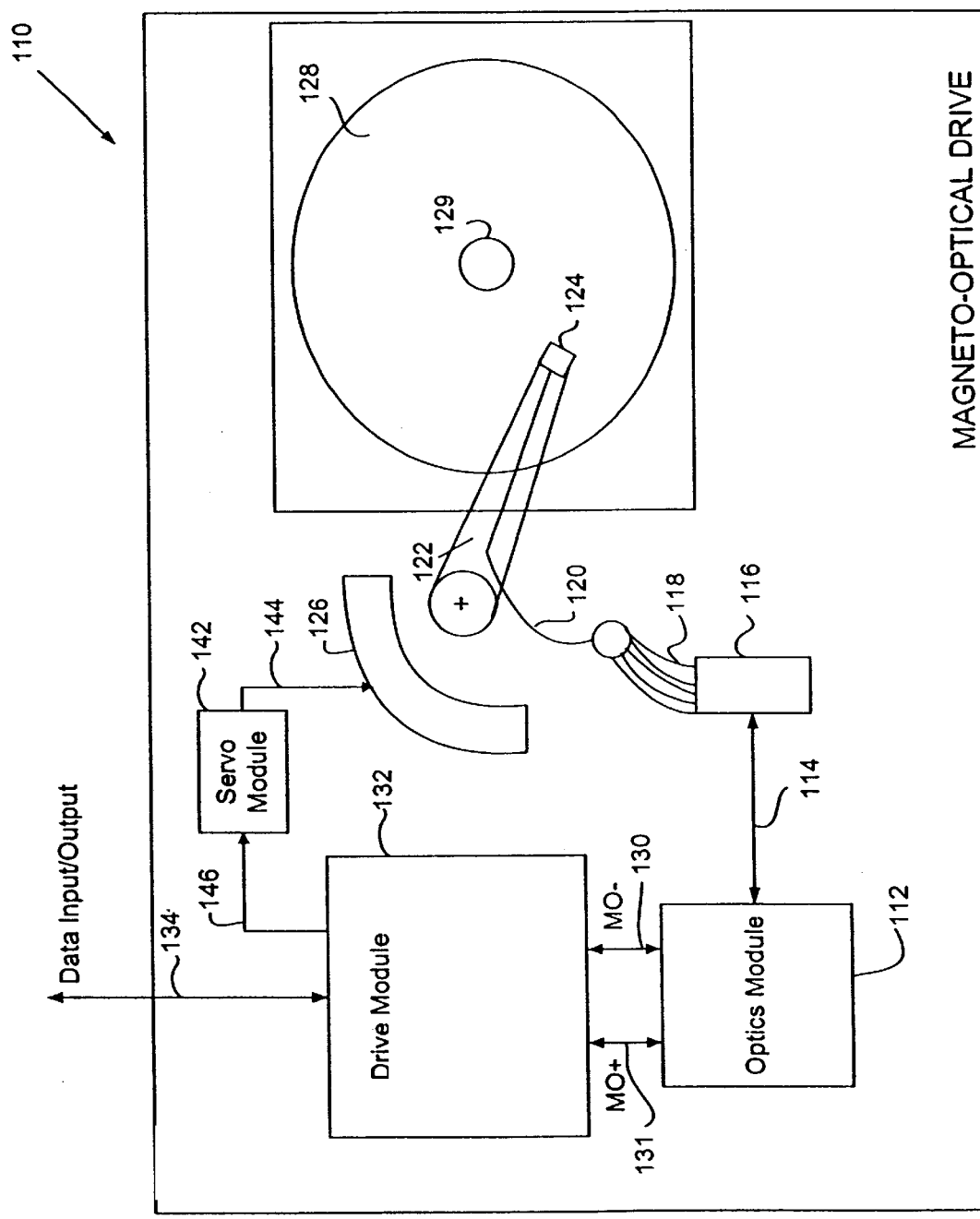
FIG. 1 is a pictorial view for one embodiment of a magneto-optical drive, according to the present invention.

Referring now to FIG. 1, a pictorial view for one embodiment of a magneto-optical drive 110 is shown. Although a magneto-optical drive is discussed here, other types of optical systems, for example an optical drive, are within the scope of the present invention. In the FIG. 1 embodiment, magneto-optical drive 110 includes an optics module 112, an optical pathway 114, an optical switch 116, a fiber bundle 118, an actuator magnet and coil 126, a plurality of head arms 122, a plurality of magneto-optical heads 124, a plurality of magneto-optical storage media 128, a drive module 132, and a servo module 142.

Each of the plurality of magneto-optical storage media 128 are mounted on a spindle 129 for continuous rotation at a constant angular velocity, and each of the plurality of magneto-optical heads 124 is preferably attached via a head arm 122 to electromagnetic actuator magnet and coil 126.

In the FIG. 1 embodiment, optical switch 116 receives light through optical pathway 114 and routes the light to one of a plurality of fibers in fiber bundle 118. The switching properties of optical switch 116 are bi-directional, so that light reflected back to switch 116 from storage media 128 along one of the fibers in fiber bundle 118 may also be routed to optical pathway 114. Each fiber of fiber bundle 118 is preferably routed along a respective head arm 122 to a respective magneto-optical head 124 and storage media 128.

A reflected light signal from storage media 128 couples back through magneto-optical head 124, one of the fibers in fiber bundle 118, optical switch 116, and reaches optics module 112 via optical pathway 114. Optics module 112 then converts the light signal to electronic signals MO− and MO+, which are then transmitted to drive control module 132 via data pathways 130 and 131. Drive control module 132 communicates the data represented by the electronic signals to a computer (not shown) via data input/output 134.

Figure 2:
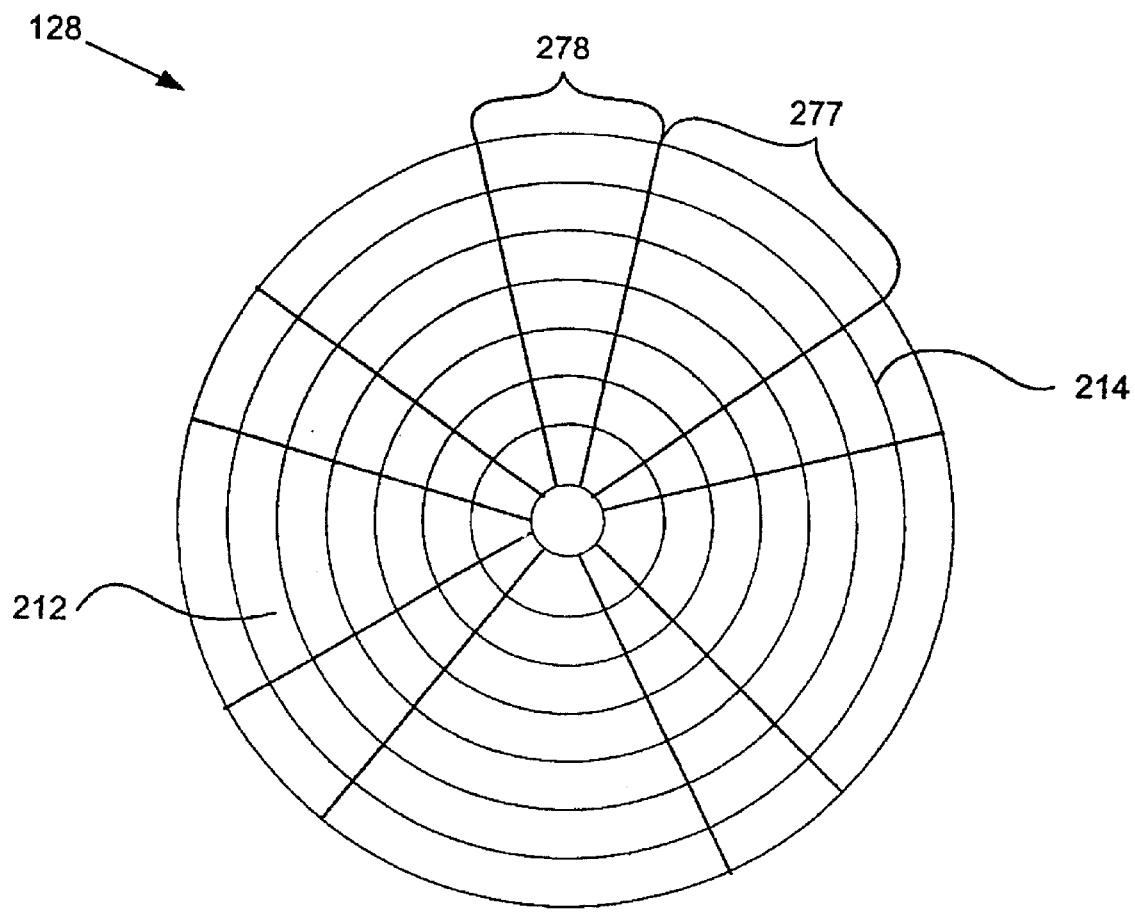
FIG. 2 is a plan view for one embodiment of a front surface of the magneto-optical storage medium of FIG. 1, according to the present invention.

Referring now to FIG. 2, a plan view of a front surface 212 of a magneto-optical storage medium 128 is shown. In MO storage devices, digital data is typically written into and read from a series of concentric or spiral tracks 214 located within a plurality of data sectors 277 on surface 212 of storage medium 128. The digital data is read from and written to surface 212 of storage medium 128 by projecting a laser-generated light spot from magneto-optical head 124 onto a selected track 214 while storage medium 128 is rotating, and then sensing the polarization of light reflected back from storage medium 128.

Head 124 must be accurately positioned above track 214 of rotating storage medium 128 during a read/write operation on that track. Many factors, for example imperfections in track symmetry, may cause head 124 to be positioned slightly off the center of track 214. Position correction of head 124 is therefore required for acceptable performance during a read/write operation.

One embodiment of a position correction technique utilizes a plurality of servo sectors 278 on surface 212 of storage medium 128. Each servo sector 278 contains read-only data that indicates the position of head 124 on storage medium 128. This read-only data may be in the form of position marks permanently embossed on surface 212 of storage medium 128 at manufacture. The position marks may be used to generate a position error signal, which may then provide feedback to compensate for position errors by adjusting the position of head 124.

Referring now to FIGS. 3(a) and 3(b), a temperature profile and the full-width-half-maximum (FWHM) diameter of a laser beam impinging on a cross-section of the media is shown and a top view of an aperture formed over magnetic domains in the media is shown, respectively. During writing, a polarized laser beam 152 is directed from a respective optical fiber 120 and head 124 towards a particular data sector 277 on storage media 128. In one embodiment, storage media 128 is a magnetic super resolution (MSR) media, of a variety well known in the art, which includes a top read-out layer 160 and a buried MO storage layer 162. Laser beam 152 impinges on readout layer 160 as an optical spot 154. A full-width-half-maximum (FWHM) diameter 156 of optical spot 154 is indicated in FIG. 3(a). Optical spot 154 preferably heats storage layer 162; a typical temperature profile formed in storage layer 162 below optical spot 154 is illustrated in FIG. 3(a). For a given temperature of storage layer 162 above a Curie point 158, application of an external magnetic field by a coil on head 124 preferably will orient magnetic dipoles within a magnetic region 172 of storage layer 162 in either an up or down direction. Depending on the direction of the external magnetic field, information embodied in the direction of the external magnetic field is stored in storage layer 162. Magnetic region 172 is formed using an external magnetic field that is applied using magnetic field modulation techniques (MFM) that are well known in the art, whereby successive magnetic regions 172 overlap each other to form a crescent shaped pattern as is illustrated in FIG. 3(b). For writing, the power level of laser beam 152 is maintained to form magnetic regions 172 with a preferable cross-track width of approximately 0.6 $\mu$m and, depending on the modulation frequency of the magnetic field, with an in-track width between approximately 0.23 and 0.46 $\mu$m.

During the reading of data, polarized laser beam 152 is applied with a lower power than during writing. Laser beam 152 is transmitted through optical fiber 120 to head 124 and towards storage media 128 to preferably form a read aperture 170. However, those skilled in the art will recognize that movement of storage media 128 underneath laser beam 152 results in a slight elongation of aperture 170. Those skilled in the art will also recognize that in contrast to the prior art, aperture 170 of the present invention permits reading of data from a region of storage media 128 that is smaller than optical spot 154. Thus, aperture 170 permits reading of data from tracks 214 that are spaced closer together than the prior art. During reading, the flux emanating from a previously written magnetic region 172 is preferably coupled to the magnetic dipoles within aperture 170 formed in readout layer 160 and oriented such that the dipoles within aperture 170 point in either an up or down direction, depending on the information stored in magnetic region 172. Laser beam 152 is reflected from readout layer 160 with an amplitude and a polarization rotation that depends on the orientation of the dipoles in readout layer 160 and with a polarization rotation that is rotated relative to laser beam 152. The amplitude and polarization rotation are embodied in a reflected laser beam 153. The readout process produces either positively-rotated light or negatively-rotated light. In this way, the pattern of up or down magnetization orientations (representative of the stored digital data) modulates the polarization of the light reflected from storage media 128.

Although a magneto-optical drive and magneto-optical storage media are discussed here, other types of drives and storage media, including those utilizing optical position sensing and magnetic data storage and retrieval, are within the scope of the present invention.

Figure 4A:
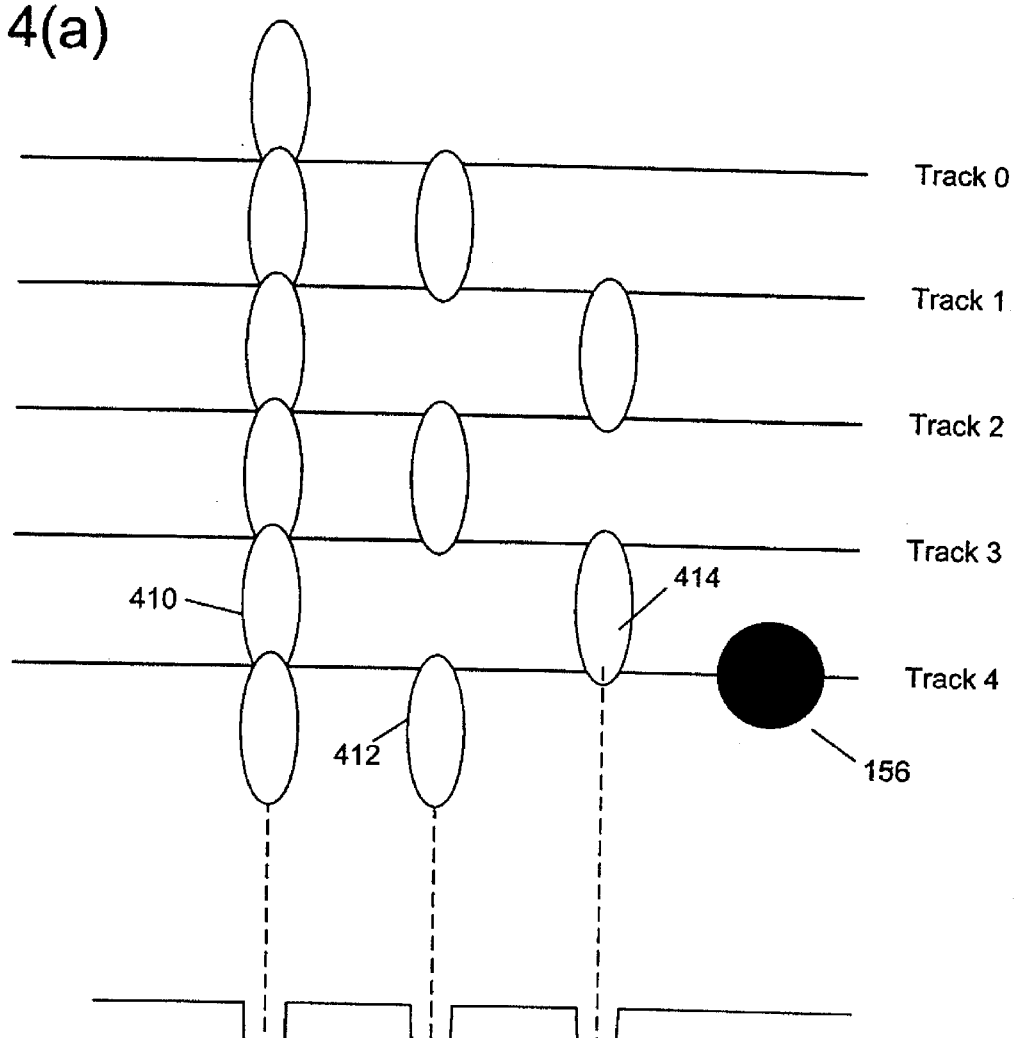
FIG. 4(a) is a diagram for one embodiment of position marks and a representative full-width-half-maximum diameter of an optical spot on a front surface of a magneto-optical storage medium.

Referring now to FIG. 4(a), a diagram of position marks on sample storage media tracks within a servo sector 278 is shown. FIG. 4(a) includes sample tracks 0 through 4. Five tracks are presented for purposes of illustration, however storage medium 128 typically contains a significantly greater number of tracks. Furthermore, FIG. 4(a) depicts track 0 through track 4 as straight, whereas in practice they are typically circular.

As shown in FIG. 4(a), each track has three associated position marks which may be repeated at selected intervals along their corresponding track. The position marks are formed by depressions in surface 212 of storage medium 128. The ellipses shown in FIG. 4(a) represent the full-width-half-maximum dimensions of the depressions. The full-width-half-maximum imensions of a depression are its dimensions at a plane located halfway between surface 212 and the bottom of the depression.

A position mark may comprise a single elliptical depression, for example position marks 412 and 414, or alternately may comprise many depressions that form a radial row, for example position mark 410. A single position mark may correspond to more than one track. In FIG. 4(a), position mark 410 corresponds to all five tracks, and position mark 414 corresponds to tracks 3 and 4.

When optical spot 156 (the full-width-half-maximum dimensions of optical spot 154) travels over a position mark, the diffraction pattern is such that most of the light is not reflected back to head 124. A resulting pulse occurs in a detected reflectivity signal that is based on the amount of light reflected back from storage medium 128 to head 124.

Figure 4B:
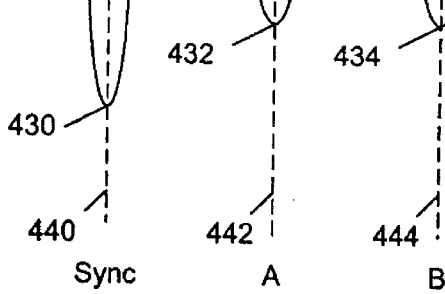
FIG. 4(b) is a drawing of a reflectivity waveform corresponding to the position marks of FIG. 4(a)

Referring now to FIG. 4(b), a drawing of a reflectivity waveform corresponding to position marks 410, 412, and 414,is shown. During a read/write operation on track 4, the head is positioned over track 4 as storage medium 128 rotates at a selected rate of speed. Head 124 initially encounters position mark 410, which is a radial bar created by overlapping elliptical depressions. When optical spot 156 passes over position mark 410, the amplitude of reflected light is reduced, generating negative-going sync pulse 430 at time 440. Ideally, a position mark would cause the reflectivity signal to fall to zero as optical spot 156 passes directly over the mark. In practice, position mark 410 is detected when the reflectivity signal becomes small, as represented by sync pulse 430.

Next, head 124 encounters position mark 412, which is positioned at a specified perpendicular distance off-center from track 4. Position mark 412 generates a negative-going pulse "A" at time 442. The amplitude of pulse A is relatively less than the amplitude of sync pulse 430 because optical spot 156 does not pass directly over position mark 412. Next, head 124 encounters position mark 414, which is positioned at the same specified distance off-center of track 4, but in the opposite direction of position mark 412. Position mark 414 generates a negative-going pulse "B" at time 444. The amplitude of pulse B is also relatively less than the amplitude of sync pulse 430. A radial position error signal (PES) for head 124 may then be obtained by taking the difference of the peak reflectivity amplitudes of pulse A and pulse B.

Drive module 132 (FIG. 1) uses the reflectivity signals to derive the position error signal (PES), which is provided as feedback via line 146 to servo module 142 (FIG. 1). Servo module 142 then generates a servo control current which is proportional to the received PES and provides the generated servo control current via line 144 to actuator 126 which responsively adjusts the position of head 124.

Figure 5:
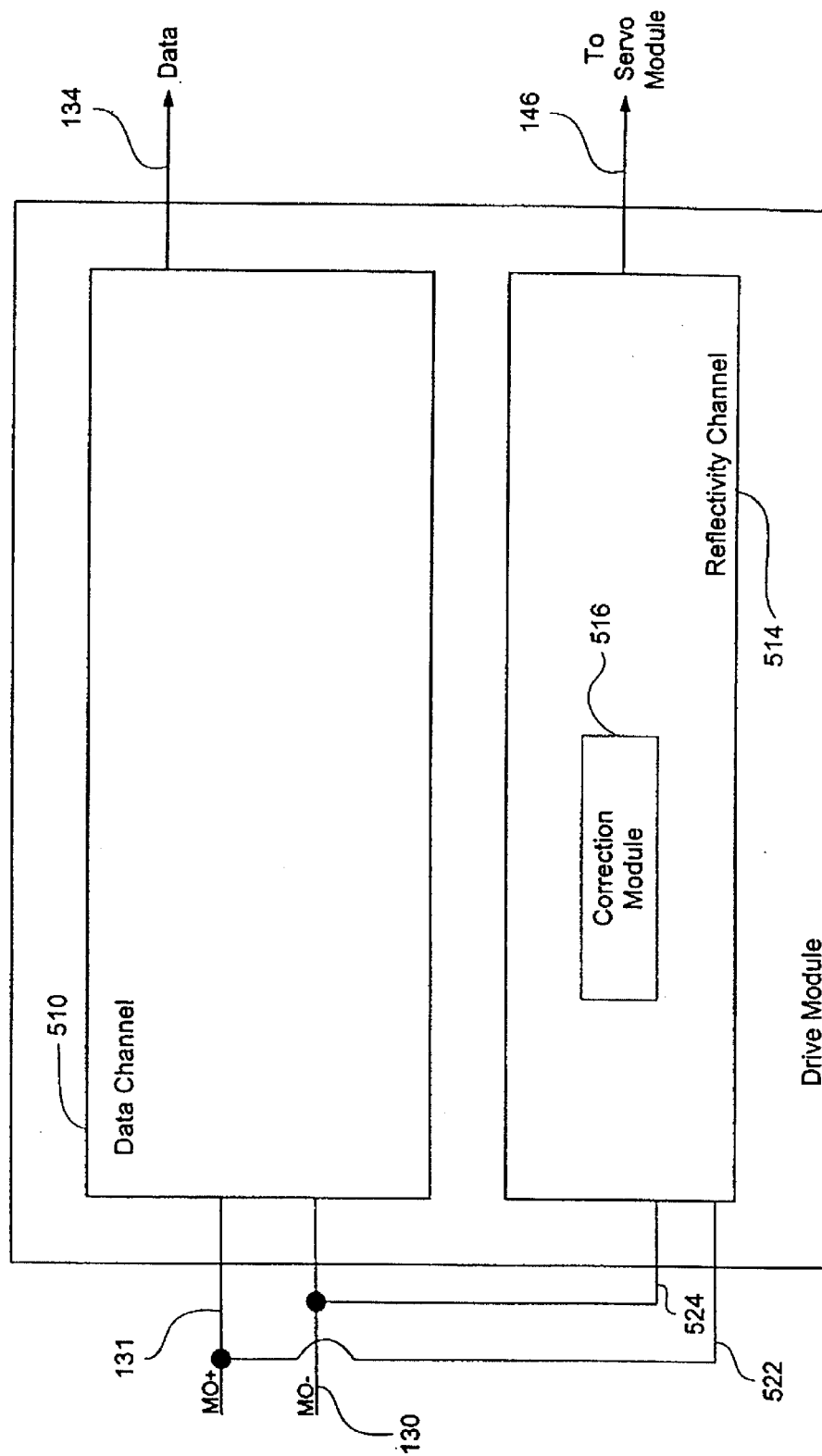
FIG. 5 is a block diagram for one embodiment of the drive module of FIG. 1, according to the present invention.

Referring now to FIG. 5, a block diagram for one embodiment of drive module 132 of FIG. 1 is shown. In the FIG. 5 embodiment, drive module 132 includes a data channel 510 and a separate reflectivity channel 514 because two distinctly different types of light sensing are utilized by magneto-optical drive 110. Data channel 510 senses light reflected from the data wedges 277 on storage media 128 to determine rotation of the plane of polarization (corresponding to each magnetically-recorded domain) and thus responsively generates corresponding digital data.

In contrast, reflectivity channel 514 senses the amplitude of light reflected from servo sectors 278 on storage media 128. For example, during read mode, the amplitude of reflected light is destructively interfered with whenever the reading light beam strikes the position marks embossed upon storage media 128. Reflectivity channel 514 then responsively utilizes the detected reflectivity signal to read data encoded on the current track and to derive a position error signal that is used to adjust and correct the radial position of head 124. Reflectivity channel 514 includes a correction module 516, to be described below in conjunction with FIGS. 6–9.

Figure 6:
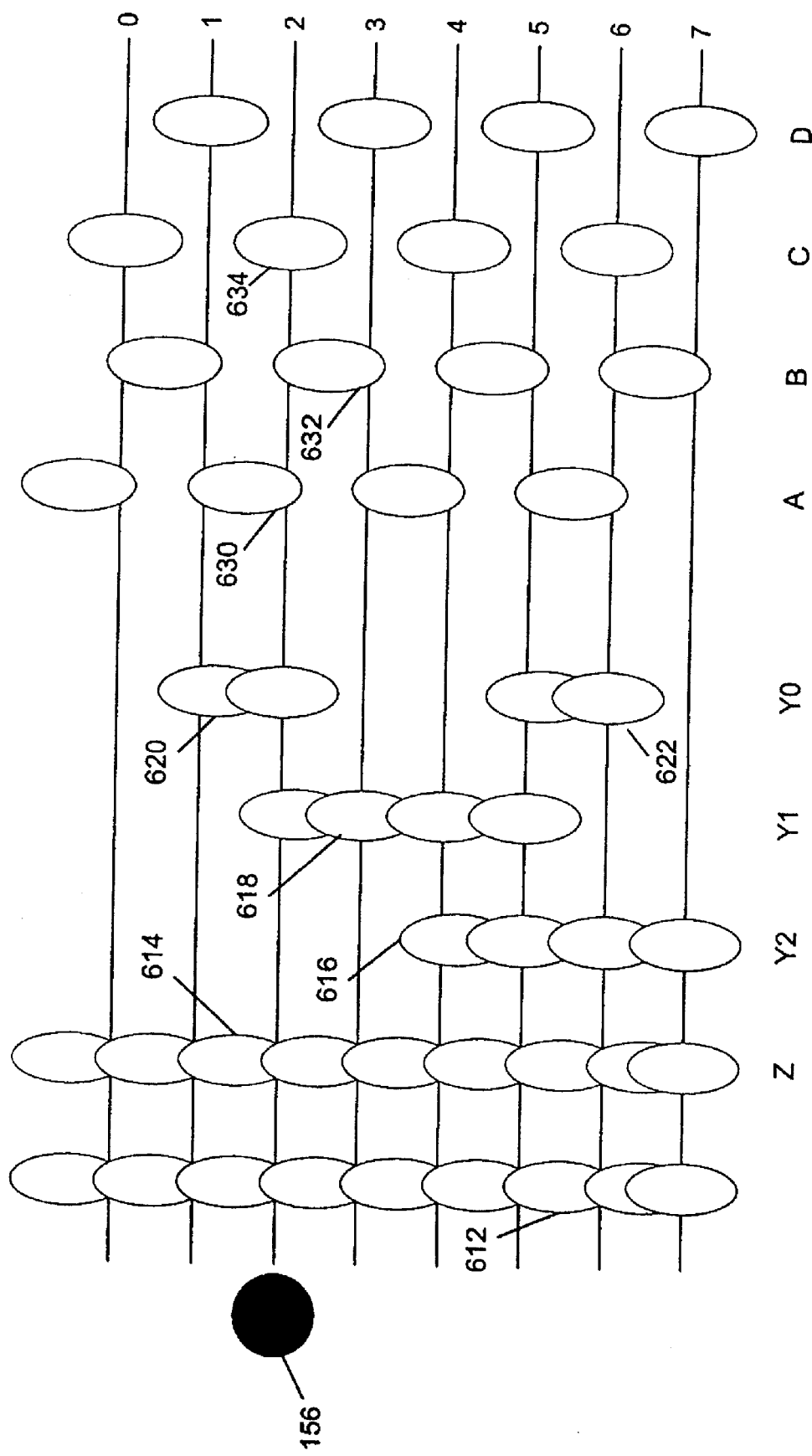
FIG. 6 is a diagram for one embodiment of position marks on sample tracks of a magneto-optical storage medium.

Referring now to FIG. 6, a diagram for one embodiment of position marks on sample tracks of a magneto-optical storage medium 128 is shown. Eight tracks are shown in FIG. 6, however, a magneto-optical storage medium typically includes a significantly larger number of tracks. The position marks are comprised of elliptical pits embossed on surface 212 of storage medium 128. Position mark 612, which comprises a row of overlapping elliptical depressions, indicates the beginning of a servo sector 278 and corresponds to tracks 0–7. Position mark 614 represents a Z bit, which is one bit of a high-order byte of a track address, and corresponds to tracks 0–7. Position marks 616–622 represent three bits, Y2, Y1, and Y0, of a low-order byte of a track address. Position mark 616 corresponds to tracks 4–7 and bit Y2, position mark 618 corresponds to tracks 2–5 and bit Y1, position mark 620 corresponds to tracks 1–2 and bit Y0, and position mark 622 corresponds to tracks 5–6 and bit Y0. A complete low-order byte of a track address contains eight bits, however, only a three-bit address is shown in FIG. 6 for ease of discussion.

The track addresses are encoded using a Gray code, wherein only a single bit changes between adjacent track addresses. A complete track address comprises a serial-encoded high-order byte and a parallel-encoded low-order byte. The high-order byte is distributed over eight successive servo sectors 278 as the Z bit. In FIG. 6, the Z bit is encoded as logic "1," and track 0 has low-order bits "000," track 1 has low-order bits "001," and track 2 has low-order bits "011."

As optical spot 156 passes along a track, a reflectivity signal, described above in conjunction with FIG. 4(–b), indicates read-only data encoded on that track. However, since optical spot 156 is large relative to the track pitch, read-only data encoded on adjacent tracks may be read as well.

For example, as optical spot 156 passes along track 1, bits Y2-Y0 should be read as "001." Optical spot 156 may alternatively read bit Y1 as a "1" because bit Y1 of track 2 is a "1." This type of error is called a "runt bit" error. For another example, as optical spot 156 passes along track 2, bits Y2-Y0 should be read as "011." Optical spot 156 may alternatively read bit Y0 as a "0" because bit Y0 of track 3 is a "0." This type of error is called a "weak one" error.

In FIG. 6, each track has four position marks corresponding to positions A, B, C, and D. Position marks A, B, C, and D represent one embodiment of a two-phase PES pattern of position marks. A two-phase PES pattern distinguishes between even (C) and odd (D) tracks. Marks A and B are used to generate a PES to correct the position of head 124 on the center of each track, as described above in conjunction with FIGS. 4–5, and marks C and D identify whether a track is even or odd, respectively. For track 2, position mark A (elliptical depression 630) and position mark B (elliptical depression 632) are used to generate a PES, and position mark C (elliptical depression 634) is read as a logic "1" to indicate an even track. For track 2, position mark D will be read as a logic "0" because there is no depression at that position.

If a single bit error occurs in the low-order track address, the two-phase PES pattern of FIG. 6 allows correction module 516 to detect and correct the error. For example, if the low-order byte of track 1 is incorrectly read as "011," optical spot 156 will typically correctly read the track, or PES, type as D. Correction module 516 may be instructed to recognize "011D" as an incorrect address. The single bit error may then be corrected using a look-up table, which matches an incorrect address with a corresponding correct address.

The FIG. 6 embodiment of a two-phase PES pattern is not able to detect double bit errors that may occur while reading low-order track addresses. For example, as optical spot 156 passes along track 3, it should read bits Y2-Y0 as "010," and read the PES type as D. However, since optical spot 156 is large relative to the track pitch, optical spot 156 may alternatively read bits Y2-Y0 as "111" with PES type D. This is the incorrect address of track 3, but the correct address of track 5. Correction module 516 can not be instructed to recognize the double bit error as an incorrect address since "111D" is the correct address of track 5.

Figure 7:
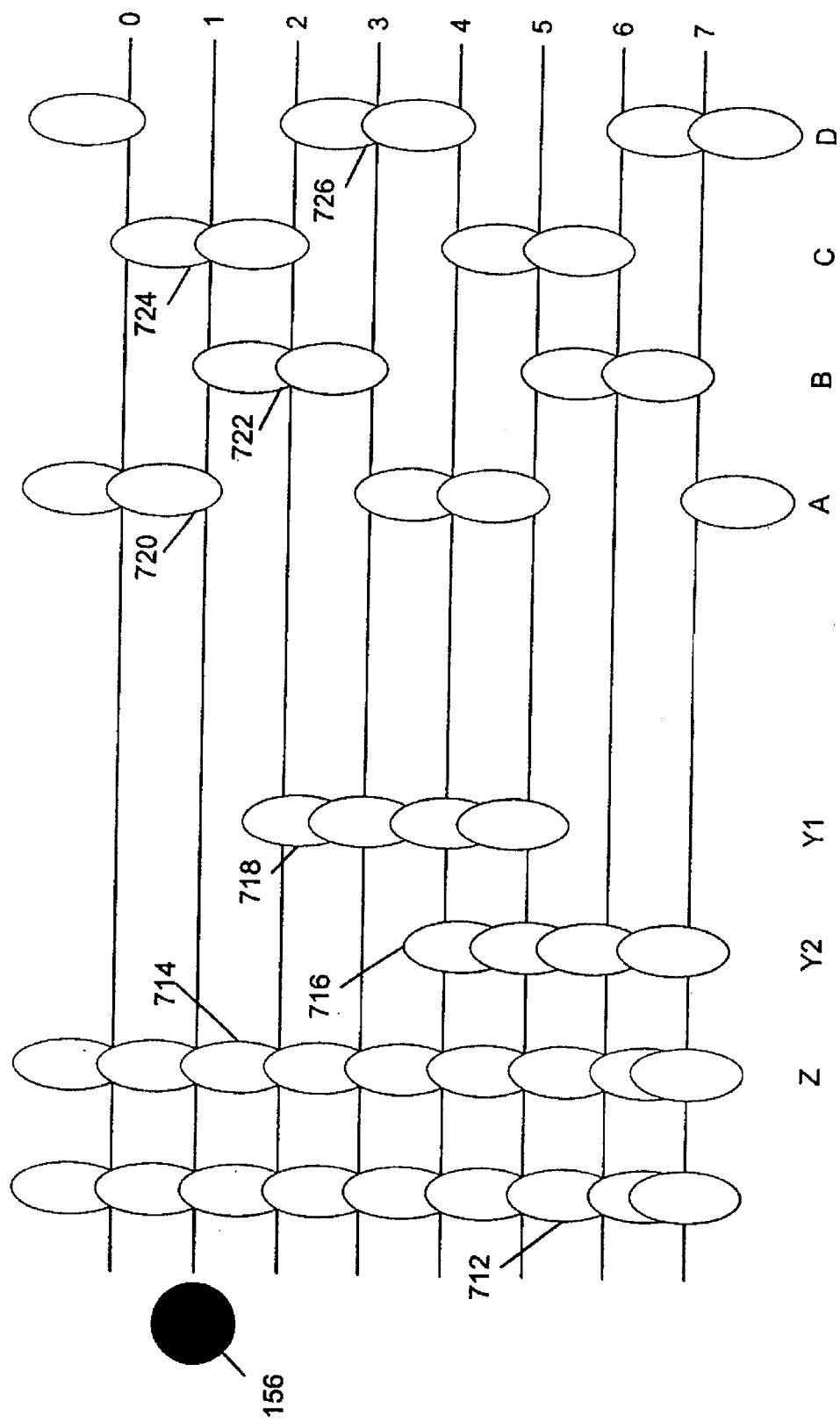
FIG. 7 is a diagram for one embodiment of position marks on sample tracks of a magneto-optical storage medium, according to the present invention.

Referring now to FIG. 7, a diagram for one embodiment of position marks on sample tracks of a magneto-optical storage medium 128 is shown, according to the present invention. Eight tracks are shown in FIG. 7, however, a magneto-optical storage medium typically includes a significantly larger number of tracks. Position marks A, B, C, and D are used to create a four-phase PES pattern. The four-phase PES pattern of the present invention comprises a pattern of position marks that repeats every four tracks. The four-phase PES pattern discriminates between four different types of tracks, instead of odd and even tracks.

In the PES pattern of FIG. 7, elliptical depressions 720 correspond to position mark A for tracks 0 and 1, elliptical depressions 722 correspond to position mark B for tracks 1, 2, and 3, elliptical depressions 724 correspond to position mark C for tracks 0, 1, and 2, and elliptical depressions 726 correspond to position mark D for tracks 2, 3, and 4. The PES type of each track is typically determined by identifying which mark of the four produces the largest pulse in the reflectivity signal. The mark centered on the track typically identifies the PES type. For instance, in FIG. 7, track 0 is type A, track 1 is type C, track 2 is type B, and track 3 is type D. Calculation of the PES of the present invention for position correction of head 124 is discussed below in conjunction with FIG. 9.

In the FIG. 7 embodiment, the low-order bytes of track addresses are encoded in Gray-coded pairs; however, other encoding schemes are within the scope of the present invention. In° FIG. 7, tracks 0 and 1 both have low-order address bits Y2 and Y1 of "00," and tracks 2 and 3 both have low-order address bits Y2 and Y1 of "01." The PES type is used to differentiate between the tracks in each pair. In other words, the PES type takes the place of the lowest bit Y0 of the low-order track address byte. Thus the track address and track type uniquely identify each track. For example, track 0 may be identified as "00A," and track 1 may be identified as "00C."

Encoding the low-order track address bytes in pairs eliminates double bit interference errors. Each track 214 has adjacent tracks with low-order address bits that are either identical (except for PES type) or different by a single bit. Any errors due to adjacent track interference will therefore be only single bit errors. Such single bit errors may be detected and corrected using a look-up table, as described below in conjunction with FIG. 10. Thus the present invention corrects interference errors in data encoded on storage media.

Figure 8A:
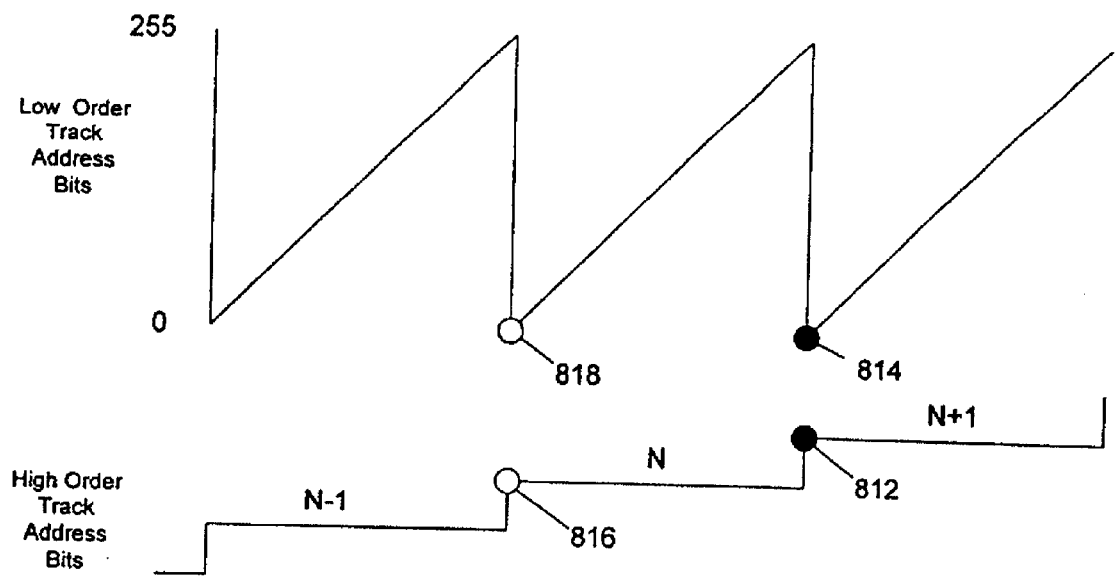
FIG. 8(a) is a graphical representation for one embodiment of a relationship between low-order track address bits and high-order track address bits.

Referring now to FIG. 8(a), a graphical representation for one embodiment of a relationship between low-order track address bits and high-order track address bits is shown. The relationship shown in FIG. 8(a) reflects the pattern of position marks in FIG. 6. In the FIG. 8(a) embodiment, the high-order byte of the track address changes every 256 tracks. The low-order byte of the track address ranges from 0 to 255, and then wraps back to 0.

Each high-order byte has an identical set of corresponding low-order bytes. If a single bit error occurs in the high-order byte, correction module 516 typically will not detect the error. For example, if the current track has an address with high-order byte 812, the current track has a corresponding low-order byte 814. If the current track's high-order byte is incorrectly read as byte 816, correction module 516 will not be able to detect the error since high-order byte 816 is part of a correct address having a low-order byte 818 that is identical to low-order byte 814. An error in the high-order byte causes correction module 516 to sense the position of head 124 as being 256 tracks away from the actual position of head 124.

Figure 8B:
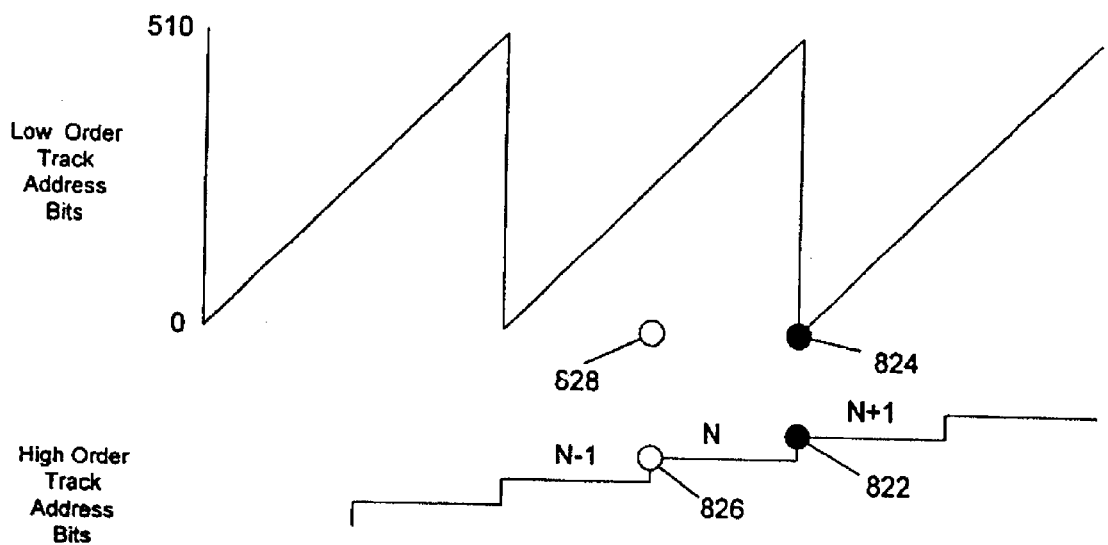
FIG. 8(b) is a graphical representation for one embodiment of a relationship between low-order track address bits and high-order track address bits, according to the present invention.

Referring now to FIG. 8(b), a graphical representation for one embodiment of a relationship between low-order track address bits and high-order track address bits is shown, according to the present invention. The relationship shown in FIG. 8(b) reflects the pattern of position marks in FIG. 7. The high-order byte of the track address changes every 256 tracks. The low-order order bytes are addressed from 0 to 255 in pairs, so the high-order byte will have changed twice when the low-order byte wraps back to 0.

In the FIG. 8(b) embodiment of the present invention, each high-order byte has a corresponding set of low-order bytes that is different from the corresponding low-order bytes of an adjacent high-order byte. In FIG. 8(b), high-order byte N has a corresponding set of low-order bytes that is different from the corresponding low-order bytes of high-order bytes N−1 and N+1. Thus if a one bit error occurs in the high-order byte, the track address as read will not correspond to a correct address and correction module 516 will detect the error.

An error in a high-order byte is corrected by using a check bit, which is encoded as the highest bit of the low-order byte. As discussed above in conjunction with FIG. 7, the PES type replaces the lowest bit of the low-order byte in the track address, which leaves one extra bit position in each servo sector 278. This extra bit position is used to encode a check bit for the high-order byte. The low-order byte of the present invention thus comprises a check bit and seven bits of track address information.

If eight servo sectors 278 have been read by head 124, correction module 516 (FIG. 5) has read all eight bits of the high-order track address byte. Correction module 516 decodes the Gray-coded high-order byte into binary, and decodes the current Gray-coded low-order byte into binary. A single bit error in the Gray-coded high order byte causes only the lowest bit of the binary high-order byte to change. The highest bit of the binary low-order byte has been encoded as a check bit for the lowest bit of the binary high-order byte. If the lowest bit of the binary high-order byte does not match the highest bit of the binary low-order byte, correction module 516 increases or decreases the binary high-order byte accordingly. Thus the system and method of the present invention detects and corrects single bit errors in the high-order track address byte.

Figures 9, 10:
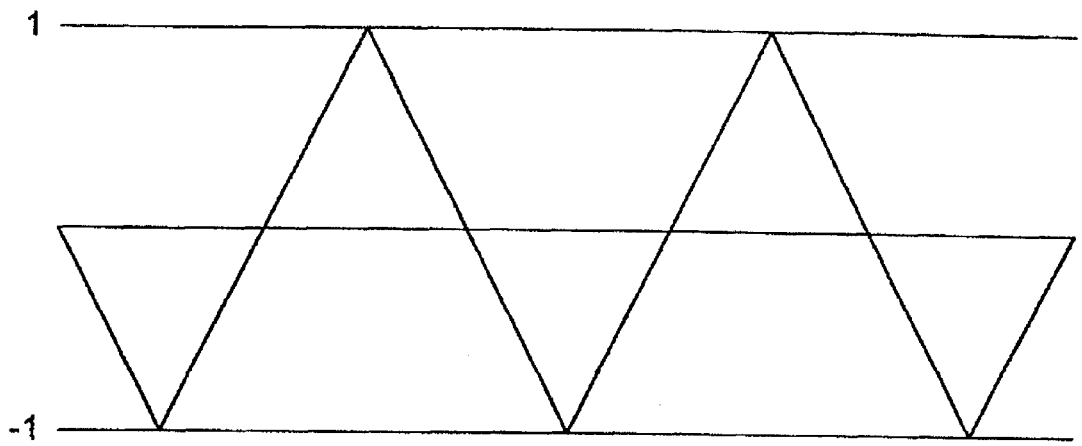
FIG. 9 is a drawing of a waveform for one embodiment of a position error signal (PES), according to the present invention.
FIG. 10 is a table representing types of errors detected and corrected by the present invention.

Referring now to FIG. 9, a drawing of a waveform for one embodiment of a position error signal (PES) is shown, according to the present invention. As optical spot 156 passes along a track 214, optical spot 156 reads a reflectivity signal from position marks A, B, C, and D. Correction module 516 compares amplitudes of the pulses in the reflectivity signal, and identifies the PES type as the mark that created the largest pulse.

Correction module 516 then calculates a PES by comparing the absolute value of A-B with the absolute value of C-D. If the absolute value of A-B is less than the absolute value of C-D, then correction module 516 calculates the PES as A-B/C-D. If the absolute value of A-B is not less than the absolute value of C-D, then correction module 516 calculates the PES as C-D/A-B. The resulting PES is a triangle waveform bounded by +1 and −1, as shown in FIG. 9. The PES is sent to servo module 142 (FIG. 1), which generates a servo control current and provides the control current to actuator 126 to responsively adjust the position of head 124.

Referring now to FIG. 10, a table representing types of errors detected and corrected by the present invention is shown. The table is used by correction module 516 to correct the low-order byte of track addresses as shown in FIG. 7. H0 represents an even high-order byte and H1 represents an odd high-order byte. If the low-order byte of the track address is read as one of the addresses in the error columns, correction module 516 recognizes the incorrect address, thus detecting the error. Correction module 516 then replaces the low-order byte as read with the corresponding correct address listed in the table.

For example, while passing along track 3, head 124 should read the low-order address bits as "01" with PES type D. However, head 124 may alternately read the low-order address bits as "11" with PES type D, since track 4 has low-order bits "11." Correction module 516 will recognize "11" with PES type D as an incorrect address, and change the address to "01" with PES type D according to the table. In this way the system and method of the present invention detects and corrects both "runt bit" and "weak one" errors.

Figure 11:
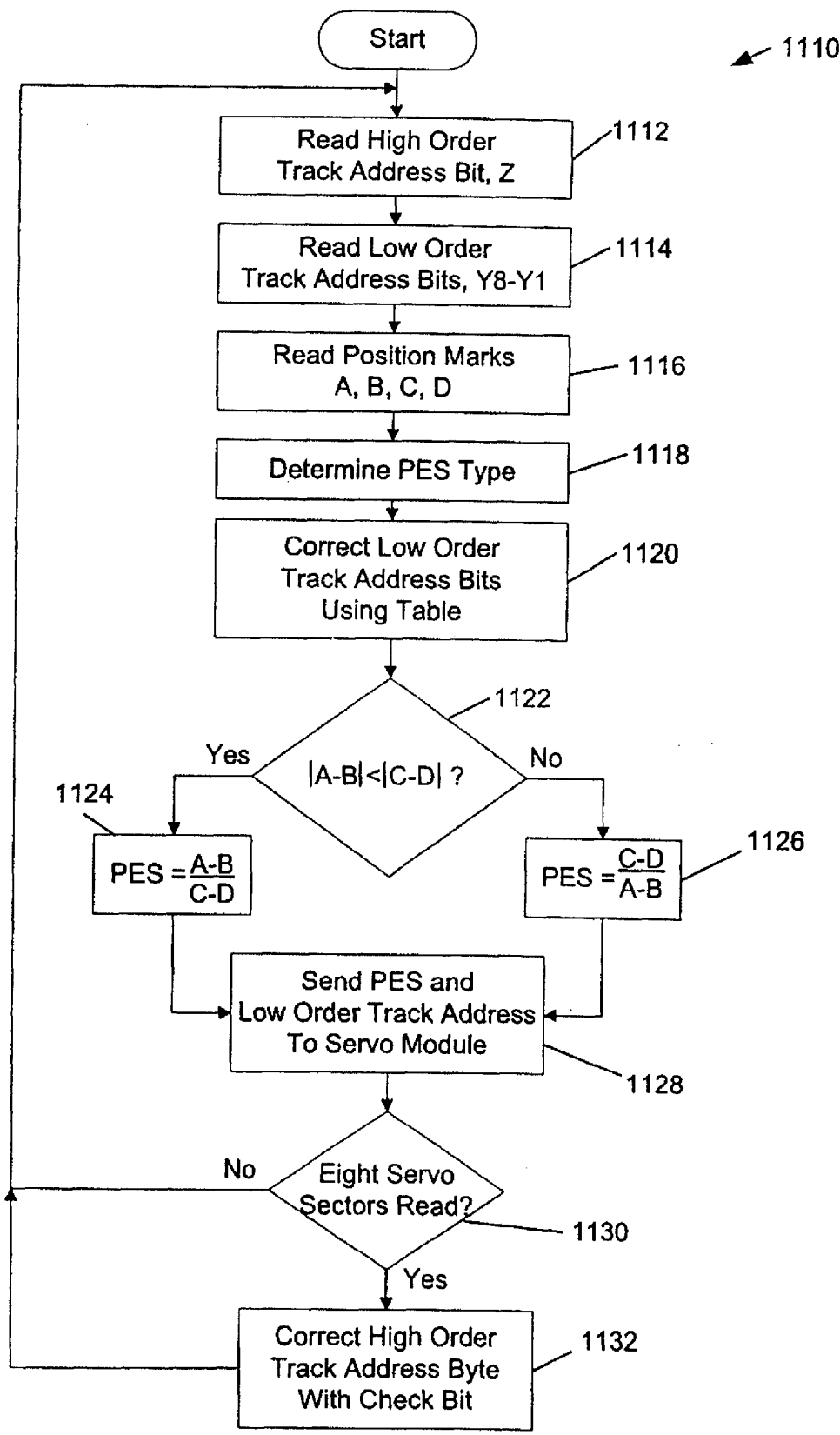
FIG. 11 is a flowchart of method steps to correct interference errors in data encoded on storage media, according to one embodiment of the present invention.

Referring now to FIG. 11, a flowchart of method steps to correct interference errors in data encoded on storage media is shown, according to one embodiment of the present invention. In step 1112, head 124 reads the high-order track address bit Z of the current servo sector 278. In step 1114, head 124 reads the low-order track address bits Y8-Y1. The low-order track address bits include a check bit and seven bits of track address information.

In step 1116, head 124 reads a reflectivity signal from position marks A, B, C, and D. In step 1118, correction module 516 in drive module 132 determines the PES type by determining which of the four position marks returned the largest reflectivity signal amplitude.

In step 1120, correction module 516 compares the low-order track address bits and the PES type against a table of errors, for example the table shown in FIG. 10. If the low-order track address bits and PES type correspond to an incorrect address, correction module 516 replaces the incorrect address bits with the correct address bits from the table.

In step 1122, correction module 516 evaluates the amplitudes of the pulses in the reflectivity signal from position marks A, B, C, and D. If the absolute value of A-B is less than the absolute value of C-D, then, in step 1124, correction module 516 calculates the PES as A-B/C-D. If the absolute value of A-B is not less than the absolute value of C-D, then, in step 1126, correction module 516 calculates the PES as C-D/A-B.

In step 1128, correction module 516 sends the PES and the corrected low-order track address bits to servo module 142 to correct the position of head 124. In step 1130, correction module 516 determines if eight servo sectors 278 have been read. If not, the method returns to step 1112 to read the next servo sector 278. If eight servo sectors 278 have been read, correction module 516 has now read all eight bits of the high-order track address byte. Correction module 516 then corrects the high-order track address byte with the check bit of the low-order byte, as described above in conjunction with FIG. 8(b). The method then returns to step 1112 to read the next servo sector 278.

The invention has been explained above with reference to a preferred embodiment. Other embodiments will be apparent to those skilled in the art in light of this disclosure. It would be obvious to one of ordinary skill in the art that the radial position error correction system and method described herein may be implemented in other types of data recording systems. The present invention may be implemented in any data recording system in which adjacent track interference can be eliminated in data recording regions but not in position sensing regions. For example, the present invention may readily be implemented in conventional inductive recording in hard disk drives by forming magnetically dead regions between tracks that would allow a wider data read head. A wider data read head would result in adjacent track interference in position sensing regions that would require correction for reliable performance. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for correcting interference errors in data encoded on a storage medium, said storage medium including tracks, said system comprising:
position marks disposed on said storage medium, said position marks being configured to encode addresses of said tracks and to encode track types; and
a correction module configured to combine each of said addresses with one of said track types to detect and correct errors in said addresses.

2. The system of claim 1, wherein said correction module detects and corrects errors in said addresses by recognizing incorrect addresses and replacing said incorrect addresses with corresponding correct addresses, wherein each of said incorrect addresses is not identical to each of said correct addresses.

3. The system of claim 2, wherein said position marks are configured to encode at least four track types.

4. The system of claim 3, wherein each of said addresses includes a high-order address byte and a low-order address byte.

5. The system of claim 4, wherein said low-order address bytes are encoded in pairs.

6. The system of claim 4, wherein each of said low-order address bytes includes a check bit for each corresponding high-order address byte.

7. The system of claim 4, wherein said position marks are disposed in a plurality of servo sectors, and wherein each high-order address byte is serial-encoded in said servo sectors and each low-order address byte is parallel-encoded in said servo sectors.

8. The system of claim 2, wherein said addresses are encoded on said storage medium using a Gray code.

9. The system of claim 3, wherein said position marks are configured in a pattern that repeats every four tracks to encode said track types, whereby a position mark of said pattern centered on one of said tracks identifies one of said at least four track types.

10. The system of claim 2, wherein said correction module recognizes said incorrect addresses and replaces said incorrect addresses with said corresponding correct addresses using a lookup table.

11. The system of claim 1, wherein said correction module senses a reflection of a light beam directed towards said position marks by a head device and uses said reflection to generate a position error signal for position correction of said head device.

12. The system of claim 11, wherein said correction module generates said position error signal for one of said tracks using a reflection of said light beam from at least two of said position marks corresponding to said one of said tracks.

13. The system of claim 12, wherein each of said at least two of said position marks corresponding to one of said tracks determines a track type of an adjacent track.

14. The system of claim 1, wherein said storage medium comprises a magneto-optical storage medium.

15. The system of claim 14, wherein said magneto-optical storage medium comprises a magnetic super resolution medium.

16. The system of claim 1, further comprising a processor coupled to said system to control said correction module.

17. The system of claim 1, wherein said system utilizes optical position correction of a head device and magnetic data storage and retrieval.

18. The system of claim 1, wherein said storage medium comprises an optically assisted conventional magnetic recording medium.

19. A method for correcting interference errors in data encoded on a storage medium, said storage medium including tracks, said method comprising the steps of:
disposing position marks on said storage medium, said position marks being configured to encode addresses of said tracks and to encode track types; and
combining each of said addresses with one of said track types to detect and correct errors in said addresses using a correction module.

20. The method of claim 19, wherein said correction module detects and corrects errors in said addresses by recognizing incorrect addresses and replacing said incorrect addresses with correct addresses, wherein each of said incorrect addresses is not identical to each of said correct addresses.

21. The method of claim 20, wherein said position marks are configured to encode at least four track types.

22. The method of claim 21, wherein each of said addresses includes a high-order address byte and a low-order address byte.

23. The method of claim 22, wherein said low-order address bytes are encoded in pairs.

24. The method of claim 22, wherein each of said low-order address bytes includes a check bit for each corresponding high-order address byte.

25. The method of claim 22, wherein said position marks are disposed in a plurality of servo sectors, and wherein each high-order address byte is serial encoded in said servo sectors and each low-order address byte is parallel-encoded in said servo sectors.

26. The method of claim 21, wherein said position marks are configured in a pattern that repeats every four tracks to encode said track types, whereby a position mark of said pattern centered on one of said tracks identifies one of said at least four track types.

27. The method of claim 20, wherein said addresses are encoded on said storage medium using a Gray code.

28. The method of claim 20, wherein said correction module recognizes said incorrect addresses and replaces said incorrect addresses with said corresponding correct addresses using a lookup table.

29. The method of claim 19, wherein said correction module senses a reflection of a light beam directed towards said position marks by a head device and uses said reflection to generate a position error signal for position correction of said head device.

30. The method of claim 29, wherein said correction module generates said position error signal for one of said tracks using a reflection of said light beam from at least two of said position marks corresponding to said one of said tracks.

31. The method of claim 30, wherein each of said at least two of said position marks corresponding to one of said tracks determines a track type of an adjacent track.

32. The method of claim 19, wherein said storage medium comprises a magneto-optical storage medium.

33. The method of claim 32, wherein said magneto-optical storage medium comprises a magnetic super resolution medium.

34. The method of claim 19, further comprising the step of controlling said correction module with a processor.

35. The method of claim 19, wherein said storage medium comprises an optically assisted conventional magnetic recording medium.

36. A system for correcting interference errors in data encoded on a storage medium, said storage medium including tracks, said system comprising:
- position marks disposed on a surface of said storage medium, said position marks being configured to encode addresses of said tracks and to encode track types;
- a head device for directing a light beam towards said position marks to produce a reflection of said light beam; and
- a correction module configured to combine each of said addresses with one of said track types to detect and correct errors in said addresses, and further configured to evaluate said reflection to calculate a position error signal for position correction of said head device.

37. The system of claim 36, wherein said correction module detects and corrects errors in said addresses by recognizing incorrect addresses and replacing said incorrect addresses with correct addresses, wherein each of said incorrect addresses is not identical to each of said correct addresses.

38. The system of claim 37, wherein said position marks are configured to encode at least four track types.

39. The system of claim 38, wherein said system is a magneto-optical drive and said storage medium is a magneto-optical storage medium.

40. The system of claim 38, wherein said correction module generates said position error signal for one of said tracks using a reflection of said light beam from at least two of said position marks corresponding to said one of said tracks, and each of said at least two of said position marks corresponding to one of said tracks determines a track type of an adjacent track.

41. The system of claim 40, wherein said position marks are configured in a pattern that repeats every four tracks to encode said track types, whereby a position mark of said pattern centered on one of said tracks identifies one of said at least four track types.

42. A system for correcting interference errors in data encoded on a storage medium, said storage medium including tracks said system comprising:
- means for disposing position marks on said storage medium, said position marks being configured to encode addresses of said tracks and to encode track types; and
- means for combining each of said addresses with one of said track types to detect and correct errors in said addresses.

43. A computer-readable medium comprising program instructions for correcting interference errors in data encoded on a storage medium having tracks by performing the steps of:
- sensing a reflection of a light beam from a head device directed towards position marks disposed on said storage medium;
- using said reflection of said light beam to read addresses of said tracks and track types using a correction module;
- combining each of said address of said tracks with one of said track types to detect and correct errors in said addresses using said correction module; and
- using said reflection of said light beam to generate a position error signal for position correction of said head device using said correction module.

* * * * *

UNITED STATES PATENT AND TRADEMARK OFFICE
CERTIFICATE OF CORRECTION

PATENT NO. : 6,604,223 B1
DATED : May 20, 1999
INVENTOR(S) : Karl A. Belser and Aihua E. Li It is certified that error appears in the above-identified patent and that said Letters Patent is hereby corrected as shown below:

Column 2,
Line 15, "high-order.byte" should read -- high-order byte --.

Column 5,
Line 39, "imensions" should read -- dimensions --.
Line 58, "414,is shown" should read -- 414 is shown --.

Column 7,
Line 10, "FIG. 4(-b)" should read -- FIG. 4(b) --.

Column 8,
Line 21, "In°" should read -- In --.

Column 9,
Line 1, "low-order order bytes" should read -- low-order bytes --.

Column 12,
Line 31, "serial encoded" should read -- serial-encoded --.

Column 14,
Line 8, "tracks said" should read -- tracks, said --.

Signed and Sealed this

Nineteenth Day of October, 2004

JON W. DUDAS
*Director of the United States Patent and Trademark Office*